US011268870B2

(12) United States Patent
Li et al.

(10) Patent No.: US 11,268,870 B2
(45) Date of Patent: Mar. 8, 2022

(54) HIGH FREQUENCY RESPONSE PRESSURE SENSOR BASED ON DIRECT CURRENT GLOW DISCHARGE PLASMA PRINCIPLE

(71) Applicant: INSTITUTE OF ENGINEERING THERMOPHYSICS, CHINESE ACADEMY OF SCIENCES, Beijing (CN)

(72) Inventors: Fan Li, Beijing (CN); Juan Du, Beijing (CN); Sichen Wang, Beijing (CN); Hongwu Zhang, Beijing (CN); Chaoqun Nie, Beijing (CN)

(73) Assignee: INSTITUTE OF ENGINEERING THERMOPHYSIC, CHINESE ACADEMY OF SCIENCES, Beijing (CN)

(*) Notice: Subject to any disclaimer, the term of this patent is extended or adjusted under 35 U.S.C. 154(b) by 98 days.

(21) Appl. No.: 16/629,840

(22) PCT Filed: Oct. 31, 2017

(86) PCT No.: PCT/CN2017/108573
§ 371 (c)(1),
(2) Date: Jan. 9, 2020

(87) PCT Pub. No.: WO2019/010868
PCT Pub. Date: Jan. 17, 2019

(65) Prior Publication Data
US 2020/0393315 A1 Dec. 17, 2020

(30) Foreign Application Priority Data
Jul. 11, 2017 (CN) ......................... 201710563822.4

(51) Int. Cl.
*G01L 9/00* (2006.01)

(52) U.S. Cl.
CPC ..................................... *G01L 9/00* (2013.01)

(58) Field of Classification Search
CPC ..... G01L 19/147; G01L 9/0042; G01L 19/04; G01L 9/0054; G01L 9/0072;
(Continued)

(56) References Cited

U.S. PATENT DOCUMENTS

2011/0128010 A1 6/2011 Gianchandani et al.
2011/0129328 A1* 6/2011 Matlis .................. G01F 15/024 415/1
2017/0097304 A1* 4/2017 Schroeder ............. G01N 21/67

FOREIGN PATENT DOCUMENTS

CN 1058649 A 2/1992
CN 102098865 A 6/2011
(Continued)

OTHER PUBLICATIONS

International Search Report and Written Opinion for Application No. PCT/CN2017/108573 dated Apr. 13, 2018, 10 pages.
(Continued)

*Primary Examiner* — Andre J Allen
(74) *Attorney, Agent, or Firm* — Alston & Bird LLP

(57) ABSTRACT

A haptic signalizing device comprises a number of piezoelectric elements arranged below a device surface such that mechanical deformations caused by the converse piezoelectric effect in the at least one piezoelectric element make the device surface to move such that the device surface follows the piezoelectric element and a driving circuit configured to cause the converse piezoelectric effect on the at least one piezoelectric element by generating an alternating electric field over the piezoelectric element in a bipolar fashion, that is, consecutively in both the same and the opposite direction with respect to the polarization of the piezoelectric element, to make the piezoelectric element to move beyond its initial position consecutively in both directions. The piezoelectric
(Continued)

4
1
2
3
5 element is arranged i) to locally move the device surface inwards when the mechanical deformation in the piezoelectric element is a deflection directed away from the device surface, and ii) to locally move the device surface outwards when the mechanical deformation in the piezoelectric element is a deflection that is directed towards the device surface.

16 Claims, 6 Drawing Sheets

(58) Field of Classification Search
CPC ... G01L 13/025; G01L 19/14; G01L 19/0038; G01L 19/0084; G01L 9/0055; G01L 9/0075; G01L 19/0069; G01L 19/0052; G01L 9/0073; G01L 19/0092; G01L 19/0618; G01L 19/0645; G01L 19/143; G01L 9/0051; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/145; G01L 19/16; G01L 7/00; G01L 9/0047; G01L 9/06; G01L 9/065; G01L 9/12; G01L 11/02; G01L 13/00; G01L 15/00; G01L 19/0015; G01L 19/003; G01L 19/02; G01L 19/0609; G01L 19/083; G01L 19/10; G01L 19/148; G01L 27/005; G01L 7/08; G01L 7/082; G01L 7/163; G01L 7/166; G01L 9/0045; G01L 9/0048; G01L 9/006; G01L 9/007; G01L 9/0076; G01L 9/04; G01L 9/045; G01L 9/125; G01L 11/00; G01L 17/00; G01L 19/00; G01L 19/0076; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16
USPC .................................................... 73/700–756
See application file for complete search history.

(56) References Cited

FOREIGN PATENT DOCUMENTS

| | | | |
|---|---|---|---|
| CN | 103884467 | A | 6/2014 |
| CN | 103906336 | A | 7/2014 |
| CN | 104101459 | A | 10/2014 |
| CN | 104540313 | A | 4/2015 |
| CN | 105181235 | A | 12/2015 |
| CN | 206291999 | U | 6/2017 |

OTHER PUBLICATIONS

Li, F. et al., *Response Regularity Between Glow Discharge Plasma and Static Pressure Change*, Transactions of China Electrotechnical Society, vol. 31, No. 24, ISSN: 1000-6753, Dec. 31, 2016, pp. 54-61.

Office Action for Chinese Application No. 201710563822.4 dated Feb. 28, 2019, 16 pages.

Office Action for Chinese Application No. 201710563822.4 dated May 21, 2019, 15 pages.

* cited by examiner

HIGH FREQUENCY RESPONSE PRESSURE SENSOR BASED ON DIRECT CURRENT GLOW DISCHARGE PLASMA PRINCIPLE

CROSS-REFERENCE TO RELATED APPLICATIONS

This application is a national phase entry of International Application No. PCT/CN2017/108573, filed Oct. 31, 2017, which claims priority to Chinese Patent Application No. 201710563822.4, filed Jul. 11, 2017, the contents of which are incorporated herein by reference in their entirety.

FIELD OF THE DISCLOSURE

The disclosure relates to multiple disciplines, such as high-pressure gas discharge, aerothermodynamics, and particularly relates to a high frequency response pressure sensor based on direct current glow discharge plasma principle.

DESCRIPTION OF THE RELATED ART

The existing dynamic measurement technology has experienced a rapid development for more than half a century, which is typically represented by semiconductor silicon piezoresistive sensor technology as well as hot film and hot wire technologies. The semiconductor silicon piezoresistive pressure sensor technology is a proven technology. Dynamic pneumatic probe technology based on the semiconductor silicon piezoresistive pressure sensor technology is widely used in measurement of turbomachinery. However, the design of the pneumatic probe is constrained by many factors. In particular, the installation way of the sensor in the probe has a great influence on the frequency response of the probe. It is generally necessary to sacrifice the frequency response of the sensor to ensure a spatial resolution of the probe, ease of installation, and robustness in the measurement process. In order to understand the entropy loss in the turbomachinery more clearly, the hot film and hot wire technologies are also used in the development of entropy probes, in addition to being used to measure airflow speed with the principle of heat transfer. However, the advanced aerodynamic probes and entropy probes have a bottleneck that the piezoresistive and thermodynamic sensors could not reach a frequency response higher than 500 kHz and are not resistant to a high temperature, due to being affected by the mass inertia and thermal inertia.

In order to capture and extract the unsteady information and fine structure of a three-dimensional flow field in a real turbomachinery, aerodynamic researchers further expect the sensor with higher time resolution. For example, for a transonic compressor having 20 blades with a rotational speed of 24000 rpm, the blade passing frequency is 8 kHz. It is well known that the flow in the blade tip region is extremely complex. A series of flow structures such as leakage flow, corner vortex, channel shock wave, boundary layer separation of suction surface, etc. interact with each other in the blade tip region. The detailed flows such as shock waves and vortex structures usually only take up less than one tenth of the width of the flow passage. Therefore, the required capturing frequency should be at least up to 80 kHz. In order to make the measured flow structure more precise, a sampling frequency which is 5 times of the capturing frequency is generally taken in an actual measurement to ensure that no information is lost. Further, considering the Nyqist frequency doubling criterion, a sampling frequency of 800 kHz is necessary. Therefore, if it is desired to achieve a breakthrough in MHz of the frequency response level and further improve a dynamic performance of advanced pneumatic probes and entropy probes, it can no longer be achieved by traditional piezoelectric ceramics, hot wire or thermal film, and new principles and methods are needed. A sensor developed based on glow discharge principle has a potential to obtain this level of the frequency response.

However, the previous efforts to explore usage of glow discharge plasma to measure aerodynamic parameters are mainly focused on the speed of airflow. The coupling mechanism between the glow discharge plasma and the gas pressure has not been understood until now. The calibration for voltage-gas pressure correlation is not performed before the glow discharge plasma is applied to the measurement of the compressor, and thus such application may be blind.

It is generally believed that an original dynamic frequency response ability of a speed probe is determined by a high voltage and high frequency power supply providing an AC carrier signal. That is, the frequency of the electrical signal of the carrier signal is the frequency response of the speed probe. The principle of measuring the speed of the airflow is described as follows: the speed and the speed disturbance affect movement of the plasma inside the electrode gap such that the voltage across the air gap and the space electric field strength increase to release more charges, which is reflected in a change of voltage. However, since the relative researches on the glow discharge plasma physics mechanism and its interaction with air are controversial and there is no definite theoretical support for the researches, the experimental results are irregular. It can be known based on gas discharge theory that the plasma is considered to be air molecule. So the frequency response of the plasma should not be determined by external circuits. In addition, in the process of modulation and demodulation, the original time-domain signal is subjected to Fourier transform to obtain the frequency-domain signal. Due to existence of the original carrier frequency, it is also doubtful in principle on how to distinguish the frequency-domain information concerned and how to be able to correspond the frequency-domain information concerned with the real flow field information.

SUMMARY

In view of the above, the present disclosure provides a high frequency response pressure sensor based on a direct current glow discharge plasma principle, including: electrodes including a cathode electrode and an anode electrode and configured for generating plasma between the cathode electrode and the anode electrode under an action of a high voltage direct current power supply; a support structure for supporting and fixing the electrodes to ensure a stable gap between the cathode electrode and the anode electrode; and a shielding casing for shielding the plasma from an external gas, such that the plasma is not affected by a flow speed of the external gas and senses only a change of pressure of the external gas.

In some exemplary embodiments of the present disclosure, the high frequency response pressure sensor further includes an external circuit for supplying a direct current voltage to the electrodes and measuring and limiting a current in a circuit to which the electrodes are connected, the external circuit including: a current sampling resistor in series connected to the electrodes and configured for measuring the current in the external circuit to which the electrodes are connected; a current limiting resistor in series connected to the electrodes and configured for limiting a value of the current in the external circuit to which the electrodes are connected; and the direct current power supply for supplying a voltage to the electrodes, the current sampling resistor and the current limiting resistor.

In some exemplary embodiments of the present disclosure, the high frequency response pressure sensor further includes an acquisition system for measuring and processing current and voltage data from the external circuit and a voltage sensor, the acquisition system including: a high voltage probe for measuring a voltage across two ends of the electrodes and a voltage across two ends of the current sampling resistor; an oscilloscope for receiving and processing voltage and current data measured by the high voltage probe; and/or a PXI acquisition system for receiving and processing voltage data attenuated by 1000 times by the high voltage probe.

In some exemplary embodiments of the present disclosure, a highest voltage amplitude of the direct current power supply is 10 kV; when the pressure sensor is in operation, the voltage across two ends of the electrodes is maintained in a range from 300 to 450 V; the current in the external circuit ranges from 1 mA to 10 mA; and the pressure sensor has a power range of from 0.3 W to 4.5 W.

In some exemplary embodiments of the present disclosure, the shielding casing is disposed on the support structure, such that a bottom of the shielding casing is in contact with the support structure, and the electrodes are shielded inside the shielding casing; and a hole is provided in the top of the shielding casing such that the plasma senses the change of pressure of the external gas.

In some exemplary embodiments of the present disclosure, the support structure includes: an electrode support column including an anode support post and a cathode support post respectively connected to the cathode electrode and the anode electrode to support and fix the anode electrode and the cathode electrode; and a non-metallic support base arranged below the electrode support column to fix the electrode support column so as to ensure a stable gap between the anode electrode and the cathode electrode.

In some exemplary embodiments of the present disclosure, the non-metallic support base and the shielding casing are made of a non-metallic material. The shielding casing is disposed on the non-metallic support base, and the bottom of the shielding casing is in contact with the non-metallic support base, such that the electrodes and the electrode support column are shielded inside the shielding casing. The shielding casing and the non-metallic support base are assembled together after being separately processed, or are formed integrally.

In some exemplary embodiments of the present disclosure, the gap between the cathode electrode and the anode electrode is determined by a pressure range to be measured. When the pressure range to be measured falls in a low pressure range, a large gap range is selected. The low pressure range means that an absolute pressure is in a range of 0.03 MPa to 0.1 MPa, and the large gap range is 200 μm to 300 μm. When the pressure range to be measured falls in a high pressure range, a small gap range is selected. The high pressure range means that an absolute pressure is in a range of 0.1 MPa to 0.5 MPa, and the small gap range is 10 μm to 100 μm.

In some exemplary embodiments of the present disclosure, a material of the electrodes is an alloy metal resistant to corrosion and high temperature or a rare metal; and/or the electrodes each have a cylindrical, semi-circular, square, flat, symmetric or asymmetric structure; and diameters of the electrodes are selectable at a level of millimeters to centimeters.

In some exemplary embodiments of the present disclosure, a calibration for a voltage-gas pressure correlation of the high frequency response pressure sensor, which includes a static calibration and a shock tube dynamic calibration, is performed before the high frequency response pressure sensor is applied to an air compressor to measure the pressure.

BRIEF DESCRIPTION OF THE DRAWINGS

The accompanying drawings are used to provide a further understanding of the present disclosure, and constitute a part of the description. The drawings are used together with the following specific embodiments to explain the present disclosure, but not to limit the present disclosure. In the drawings.

LIST OF REFERENCE NUMERALS

1—discharge electrode; 2—electrode support column; 3—non-metallic support base; 4—shielding casing; 5—base hole.

DETAILED DESCRIPTION OF EMBODIMENTS

In order to make objectives, technical solutions, and advantages of the present disclosure more clear, the present disclosure will be further described in detail below with reference to specific embodiments and the accompanying drawings.

The technical solutions in the embodiments of the present disclosure will be clearly and fully described with reference to the drawings in the embodiments of the present disclosure herein. Obviously, the described embodiments are only a part of the embodiments of the present disclosure rather than all the embodiments. All other embodiments obtained by a person of ordinary skill in the art based on the embodiments of the present disclosure without creative efforts shall fall within the protection scope of the present disclosure. It should also be noted that the preset disclosure is not exactly limited to specific parameter values provided in the present disclosure, rather is approximate to the provided values within acceptable error tolerances or design constraints.

Figure 1:
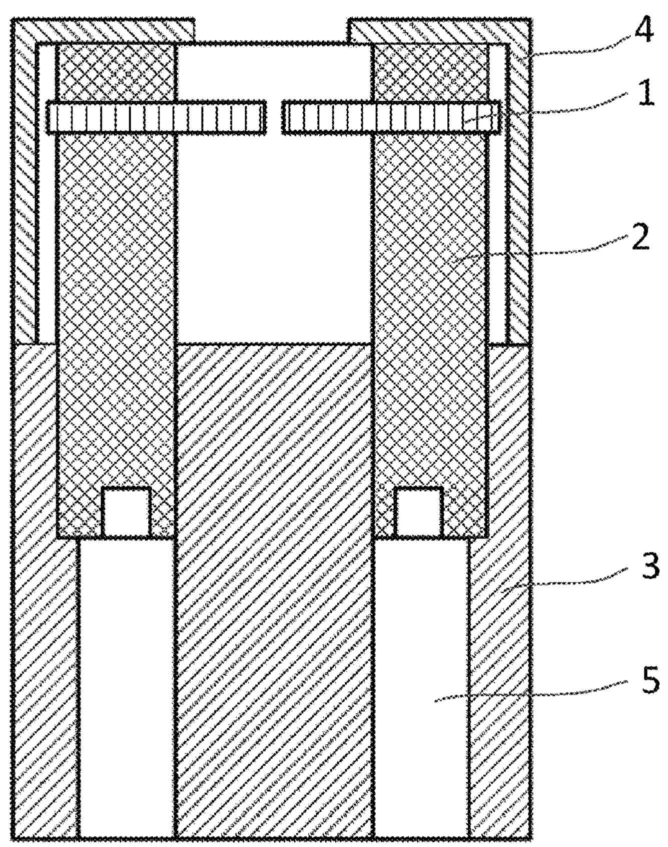
FIG. 1 is a structural cross-sectional view of a high frequency response pressure sensor based on direct current glow discharge plasma principle according to an embodiment of the present disclosure.
Figure 2:
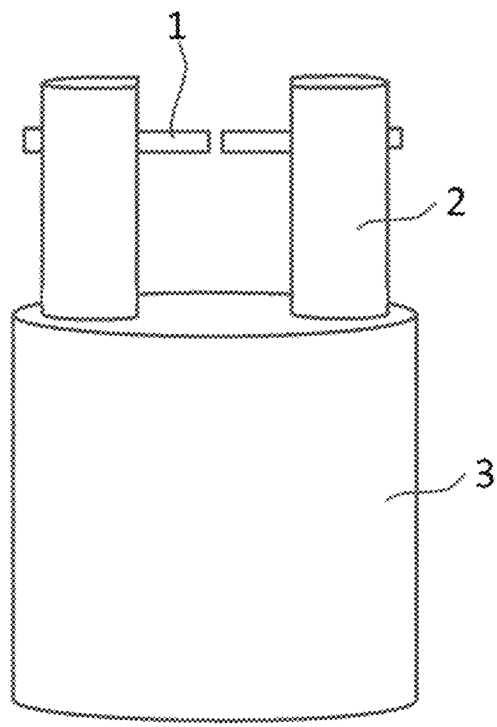
FIG. 2 is a schematic structural diagram of a plasma pressure sensor with a shielding casing removed, according to an embodiment of the present disclosure.
Figure 3:
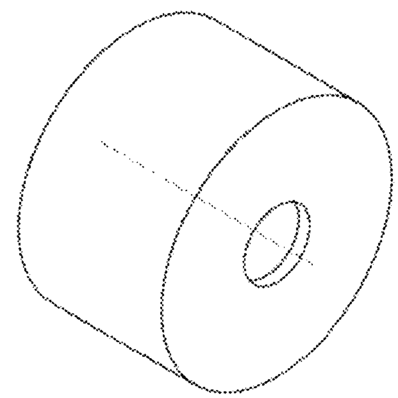
FIG. 3 is a schematic structural diagram of a shielding casing according to an embodiment of the present disclosure.
Figure 4:
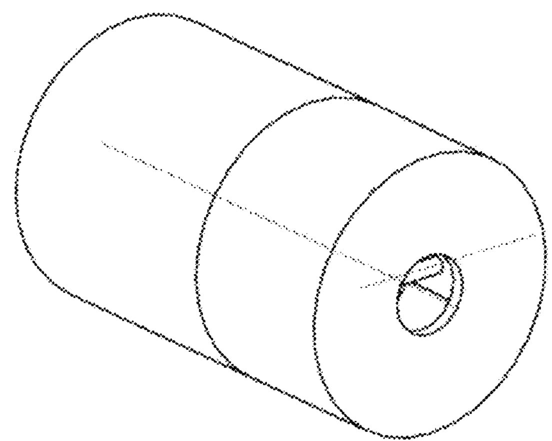
FIG. 4 is a side view of a high frequency response pressure sensor based on direct current glow discharge plasma principle according to an embodiment of the present disclosure.

As shown in FIGS. 1 to 4, FIG. 1 is a structural cross-sectional view of a high frequency response pressure sensor based on DC (direct current) glow discharge plasma principle according to an embodiment of the present disclosure; FIG. 2 is a schematic structural diagram of a plasma pressure sensor with a shielding casing removed, according to an embodiment of the present disclosure; FIG. 3 is a schematic structural diagram of a shielding casing according to an embodiment of the present disclosure; and FIG. 4 is a side view of a high frequency response pressure sensor based on direct current glow discharge plasma principle according to an embodiment of the present disclosure. An embodiment of the present disclosure provides a high frequency response pressure sensor based on direct current glow discharge plasma principle, including a discharge electrode 1, an electrode support column 2, a non-metallic support base 3, and a shielding casing 4.

The discharge electrode 1 includes a cathode electrode and an anode electrode, and is driven by a high voltage direct current. A sensing component of the pressure sensor for sensing the pressure is a bare metal electrode.

The electrode support column 2 includes a cathode support post and an anode support post, which are respectively connected to the cathode electrode and the anode electrode and are respectively used to fix the two electrodes. The electrode support column is generally made of metal that is easy to be processed and has good conductivity, such as copper, stainless steel, etc.

The non-metallic support base 3 is cylindrical and is arranged below the electrode support column 2. The electrode support column is embedded inside the non-metallic support base so as to fix the electrode support column such that an electrode gap is ensured. A non-metallic material resistant to high temperature and not easy to deform, such as polytetrafluoroethylene, is selected as the material of the non-metallic support base. The non-metallic support base is provided with two base holes 5 extending upward from the bottom of the base, and each of the base holes 5 is open upward to the bottom of the electrode support column. A wire passes through the base hole such that the wire is in contact with the bottom of the electrode support column, enabling connection of the discharge electrode to an external circuit.

The shielding casing 4 has a cylindrical shape with a diameter substantially equal to that of the support base. The bottom of the cylinder is open to outside and the top of the cylinder is closed. A through hole penetrating a top surface of the cylinder is provided at a center position of the top of the cylinder. The shielding casing 4 is provided over an upper portion of the non-metallic support base. When the non-metallic support base is covered and engaged with the bottom of the shielding casing 4, the electrode support column 2 and the discharge electrode 1 can be enclosed inside the shielding casing 4, so that the generated plasma does not directly contact the external gas and is not affected by speed of the external airflow. However, the generated plasma can experience a change of outside gas pressure. A non-metal material with a desired strength, such as organic glass, etc, is selected as a material of the shielding casing.

The base and the shielding casing may be separately prepared and then assembled together, or they may be formed integrally.

The shape of each component described above is only one embodiment of the present disclosure, and is not intended to limit the present disclosure. In other embodiments of the present disclosure, each component may have other shapes.

The parameters of the discharge electrode 1 are provided as follows:

Electrode diameter: The electrode diameter is in a range from millimeters to centimeters.

Electrode gap: The electrode gap is determined by the pressure range to be measured and is usually in a range of 10~100 μm or 200~300 μm; a large gap range, namely 200~300 μm, is selected for a low pressure range (absolute pressure of 0.03~0.1 MPa), and a small gap range, namely 10~100 μm, is selected for a high pressure range (absolute pressure of 0.1~0.5 MPa).

Electrode material: The electrode material is intended to ensure a stable glow power generation in a enough long time period, that is, to reduce the electrode sputtering and noise level as much as possible; the material itself has high thermal conductivity, high specific heat, and high electrical conductivity to keep the electrode temperature close to the temperature of the airflow and to reduce a current change caused by a temperature difference; the material should have good processability, that is, it can be made into a given geometry to ensure a surface roughness. The material of the discharge electrode may be any rare metal, such as platinum, tantalum or iridium, etc., and alloy metals that are corrosion-resistant, high-temperature-resistant and easy to be processed, such as platinum-rhodium alloy, iridium-platinum alloy, and platinum-tungsten alloy, etc.

Electrode surface state: Any non-smooth part of the electrode surface will affect the stability of glow power generation. The convex or concave parts will cause discontinuities in the electric field gradient and the electrons will focus on these points. This will cause a local temperature to rise and melt the electrode, which is one of the reasons for generation of the sputtering. Therefore, the smoother the electrode surface is in the manufacturing process, the better the stability of the glow power generation is.

Electrode structure shape: Different electrode shapes are chosen to get a calibration curve of voltage value to gas pressure such that a relative sensitive gas pressure range corresponding to different electrode shapes can be obtained. Then different electrode shapes may be selectively applied to different flow fields. The electrode structure may be of various shapes, such as cylindrical, semi-circular, square, flat, symmetrical, asymmetric, etc.

Figure 5:
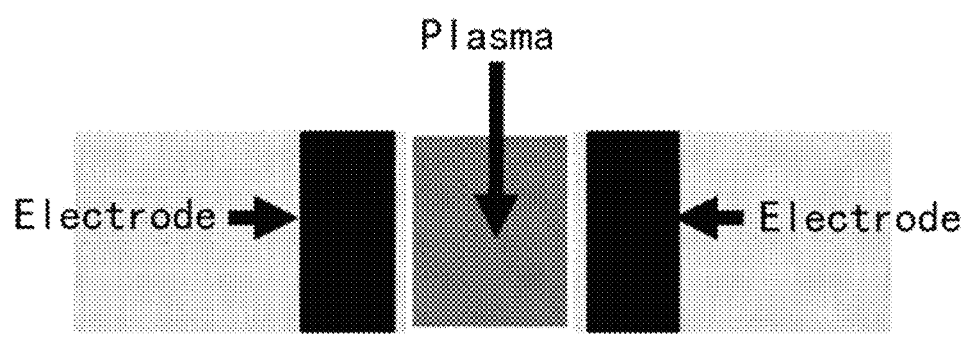
FIG. 5 is a schematic diagram showing a principle of measuring gas pressure and a disturbance based on plasma, according to an embodiment of the present disclosure.

FIG. 5 is a schematic diagram showing a principle of measuring a gas pressure and a disturbance based on plasma according to an embodiment of the present disclosure. As shown in FIG. 5, the measurement principle of the plasma pressure sensor of the present disclosure can be described as follows: the discharge electrode (electrode gap d is in the order of 50 to 300 μm)) is embedded in the fixed wall (the flow rate of the airflow in the boundary layer is zero) such that a current in the external circuit where the discharge electrode is located is limited to a desired constant value; considering the relationship between the theoretical formula and the experimental calibration, the change characteristics of the applied voltage of the discharge electrode to the gas pressure are measured. That is, the corresponding relationship between the voltage and the gas pressure of the discharge electrode is calibrated.

For a specific type of working gas (such as air), its corresponding discharge parameters (including electrical parameters such as voltage and current, and physical parameters such as electron density and ion density) are significantly affected by environmental parameters such as gas pressure, flow speed, thickness of air gap, and electrode material. The influence of a certain parameter (such as gas pressure) on the parameters of the discharge plasma is studied in a case that other parameters are supposed to be constant, so that the relationship between this parameter and each discharge parameter can be obtained; otherwise, under certain conditions, these relationships can be used to obtain environmental parameters in the discharge plasma area (such as gas pressure, flow speed, etc.). Pressure may affect aerodynamic characteristics of the plasma itself. The average molecular free path is inversely proportional to the pressure. The change in pressure will cause the average molecular free path to change, which will affect the magnitude of the power coefficient as well as recombination and diffusion, resulting in a change in voltage.

With the plasma pressure sensor of the present disclosure, the problem in decoupling the speed of the airflow and the pressure is solved by improving the structure of the sensor, shielding the speed of the airflow, and studying the steady-state response characteristics and dynamic response characteristics of the direct current-driven glow discharge plasma to the gas pressure.

The high frequency response pressure sensor based on direct current glow discharge plasma principle according to the embodiment of the present disclosure further includes an external circuit and a high frequency and high precision acquisition system.

Figure 6:
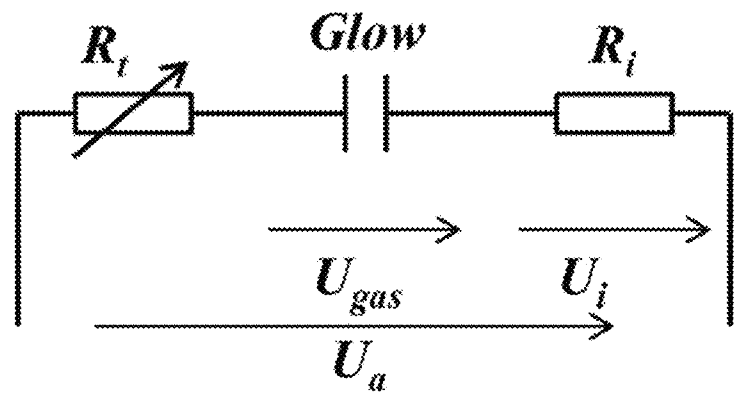
FIG. 6 is a schematic structural diagram of an external circuit according to an embodiment of the present disclosure.

The external circuit is used to measure the current in the circuit where the electrode is located, and the discharge electrode is connected to the external circuit through the base hole in the non-metallic support base. FIG. 6 is a schematic structural diagram of an external circuit according to an embodiment of the present disclosure. As shown in FIG. 6, the external circuit includes a direct current power supply $U_a$, a current limiting resistor $R_t$, and a current sampling resistor $R_i$.

The high frequency and high precision acquisition system is used to acquire and process current and voltage data from the external circuit and the voltage sensor. The high frequency and high precision acquisition system includes a high voltage probe and an oscilloscope or a PXI acquisition system.

As shown in FIG. 6, by measuring a voltage across a non-inductive resistor with a known resistance value (that is, the current sampling resistor $R_i$) with the external circuit, the total current in the circuit (including the displacement current and the gas discharge current across the air-gap equivalent capacitor) can be obtained. The non-inductive resistor (the current sampling resistor $R_i$) is connected in series between the cathode electrode for bare electrode glow discharge and the ground in the circuit. In order to reduce external electromagnetic interference, the non-inductive resistor is provided in a metal shielding box. The non-inductive resistor (the current sampling resistor $R_i$) may be a low-inductance metal film resistor with a resistance value of 509Ω.

Rt represents a current limiting resistor that is used to limit the current value in the external circuit and that is usually of 100 kΩ~500 kΩ Ri represents a current sampling resistor that is usually of 2.5Ω~100Ω. In an experiment, the voltage $U_{gas}$ between two ends of the sensor and the voltage $U_i$ between two ends of the current sampling resistor $R_i$ can be directly measured through the oscilloscope high voltage probe, and the current in the circuit can be converted as follows:

$$I=U_i/R_i.$$

The plasma between the discharge electrodes is driven by a high voltage direct current power supply $U_a$, and the maximum voltage amplitude of the power supply is 10 kV. Using a direct current power supply to drive the glow discharge avoids the frequency interference caused by AC carrier frequency modulation and demodulation, and the direct current driving has the advantages of easy control and easy generation of a stable glow discharge. When the sensor operates, the voltage is maintained in a range of 300-450V. The voltage probe attenuates the high voltage value of the high voltage direct current power supply to a low voltage with a ratio of 1000:1. The loop current in the external circuit is in a range of 1~10 mA, and the sensor power is 0.3-4.5 W.

A direct current high voltage power supply is used in the disclosure. The current is controlled to be in a range of 2~25 mA and the voltage range is controlled to be in a range of 300~2000V. The voltage and current data obtained through the measurement are transmitted to and recorded in a digital storage oscilloscope (model DPO3034) through a high frequency coaxial cable (with a wave impedance of 50Ω) to facilitate a subsequent data processing. The four-channel oscilloscope has a bandwidth of 300 MHz and a sampling rate of 2.5 GSamples/s. At the same time, the voltage data obtained from the measurement can be transmitted to the dynamic data acquisition card PXI through a high voltage probe with an attenuating ratio of 1000 times, and stored in the computer.

Figure 7:
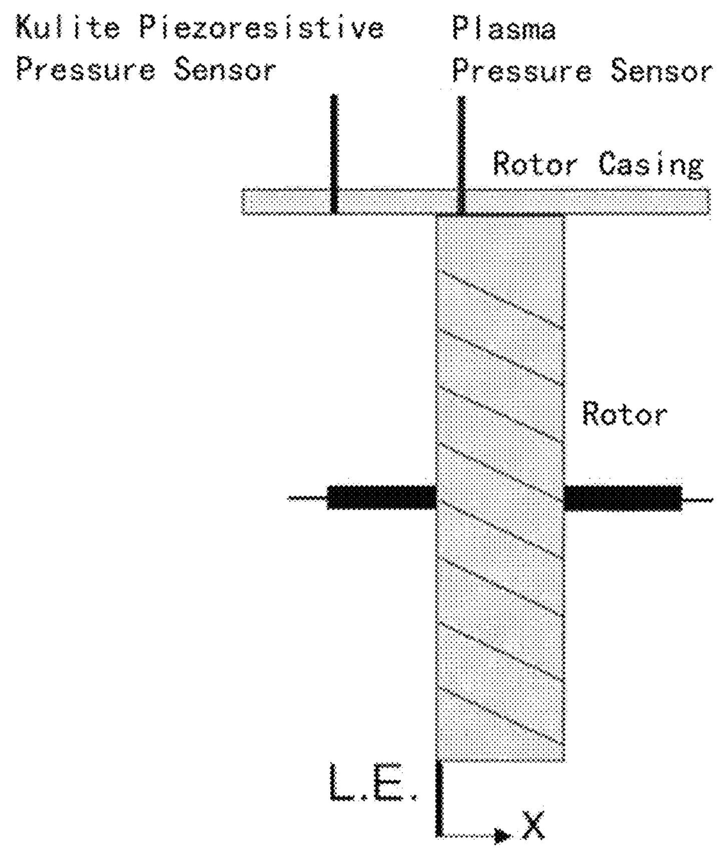
FIG. 7 is a diagram of application for measuring a pressure fluctuation at a blade tip of a rotor blade of a compressor using a plasma pressure sensor according to an embodiment of the present disclosure.

FIG. 7 shows a practical application for measuring a pressure fluctuation at a blade tip of a rotor blade of a compressor using a plasma pressure sensor. As shown in FIG. 7, the plasma pressure sensor is provided on a wall surface of the casing downstream of a leading edge of the compressor rotor, so that the plasma senses only the pressure disturbance on the wall surface. Further, a Kulite piezoresistive sensor is provided upstream of the leading edge of the rotor to provide a reference signal. The pressure signal at the wall surface of the compressor is measured under operating conditions including a high flow operating condition, a small flow operating condition, a near stall operating condition and a stall operating condition. The abilities of Kulite piezoresistive pressure sensor and the plasma pressure sensor to capture stall precursors are compared and analyzed.

With the high frequency response pressure sensor based on direct current glow discharge plasma principle according to the present disclosure, by arranging the sensor on top of a high-load compressor blade such that it senses pressure fluctuations on the wall surface, a high frequency dynamic pressure measurement in the blade tip region of a compressor can be realized, thereby capturing the stall precursors and the pre-stall precursors.

Figure 8:
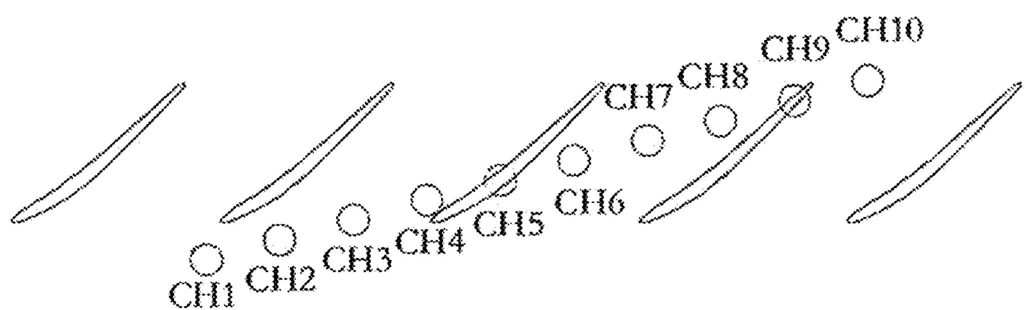
FIG. 8 is a sensor arrangement diagram for dynamic pressure measurement of a static pressure flow field at a blade tip of a rotor blade using a plasma pressure sensor according to an embodiment of the present disclosure.

FIG. 8 is a sensor arrangement for dynamic pressure measurement of a static pressure flow field at a blade tip of a rotor blade using the plasma pressure sensor. As shown in FIG. 8, several Kulite piezoresistive pressure sensors are arranged in one channel of the rotor casing from upstream to downstream, and plasma pressure sensors are arranged in another channel. CH1~CH10 in the figure represent Kulite piezoresistive pressure sensors or plasma pressure sensors. A steady mapping and a blade tip pressure fluctuation intensity as well as a power spectrum distribution of the static pressure flow field at the blade tip of the rotor blade can be provided by performing a high frequency pressure data acquisition with these dynamic pressure sensors and by employing a phase-locked averaging method and a power spectrum density data processing method.

With the high frequency response pressure sensor based on direct current glow discharge plasma principle according to the present disclosure, a blade tip pressure fluctuation intensity and a steady mapping of the static pressure flow field at the blade tip of the rotor blade can be measured and obtained by arranging the array of sensors at different axial positions on the wall surface at the blade tip of the compressor, by measuring the pressure on the wall surface and finally employing a phase-locked averaging method and a data processing method.

In order to make the measurement more accurate, a calibration for a voltage-gas pressure correlation of the high frequency response pressure sensor according to the embodiment of the present disclosure, which includes a static calibration and a shock tube dynamic calibration, can be performed in a calibration device before the high frequency response pressure sensor is applied to a measurement of the compressor.

Figure 9:
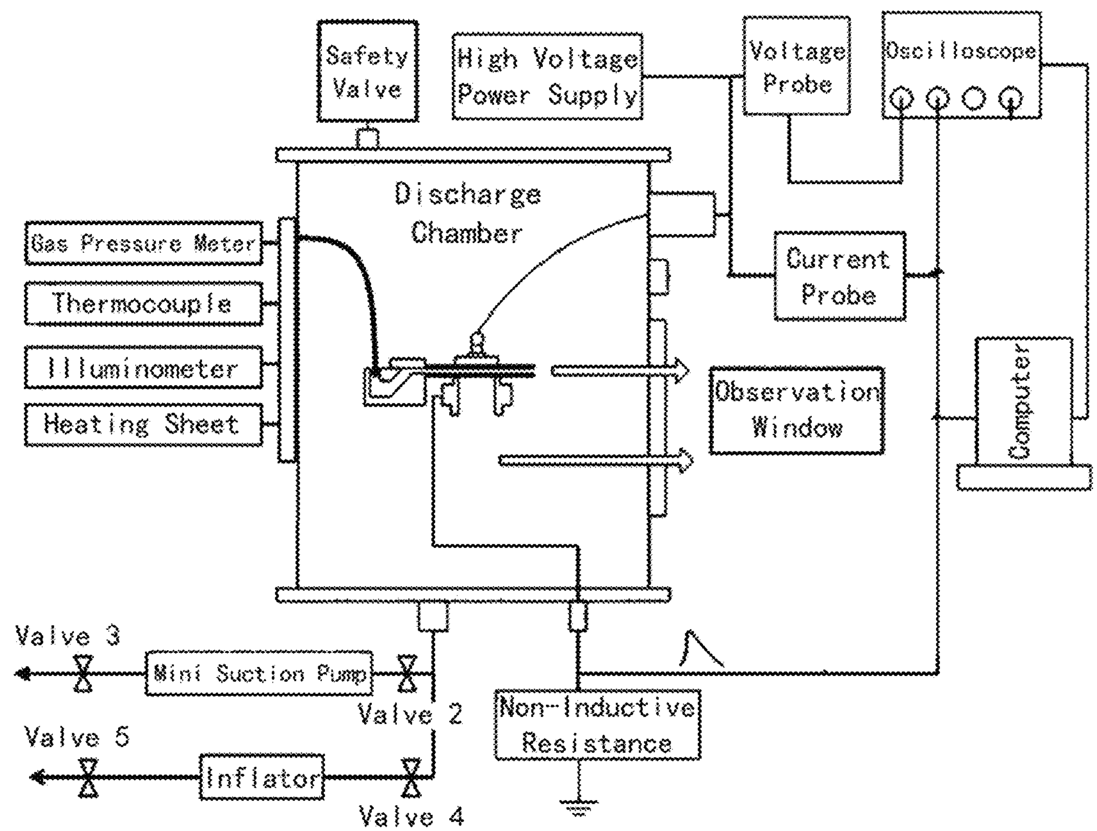
FIG. 9 is a schematic diagram of components of a high pressure static calibration system according to an embodiment of the present disclosure.

FIG. 9 is a schematic diagram of components of a high pressure static calibration system according to an embodiment of the present disclosure. As shown in FIG. 9, a discharge chamber of the high pressure static calibration system is a cylindrical pressure vessel, of which the design pressure (absolute pressure) is 0-1000 kP. The pressure in the discharge chamber is changed within a controllable range by an air pump, thereby providing different pressure environments for discharging. It can be accurately diagnosed on whether the discharge mode is a glow discharge to obtain a mutual conversion relationship between different discharge modes. The characteristics of gas discharge with a large pressure and a small gap include electrical characteristics. The electrical characteristics include a volt-ampere characteristic curve, a current density, power measurement, etc., which are the basis for judging the gas discharge mode and physical parameters. In the calibration experiment, firstly, a certain gap and a certain current are provided to be constant under a condition of atmospheric pressure to obtain a stable and gentle glow discharge. The change curve of the sustaining voltage (or power supply) to the discharge time is measured to study and confirm a stability of the pressure measurement by plasma. Then, the electrode gap is changed, and the response characteristics of the sensor's sustaining voltage (or power supply) in different gaps to the change in pressure are studied. The specific operation method includes: adjusting the amplitude of the applied voltage, keeping the current unchanged, changing the pressure in the discharge chamber, and recording the pressure in the discharge chamber and the voltage (or power supply) after a stable glow discharge. After one group of steps is completed, the electrode gap is changed, and the above process is repeated to obtain the relationship curve between the pressure and the voltage (or power supply) between two ends of the sensor for different electrode gaps.

Figure 10:
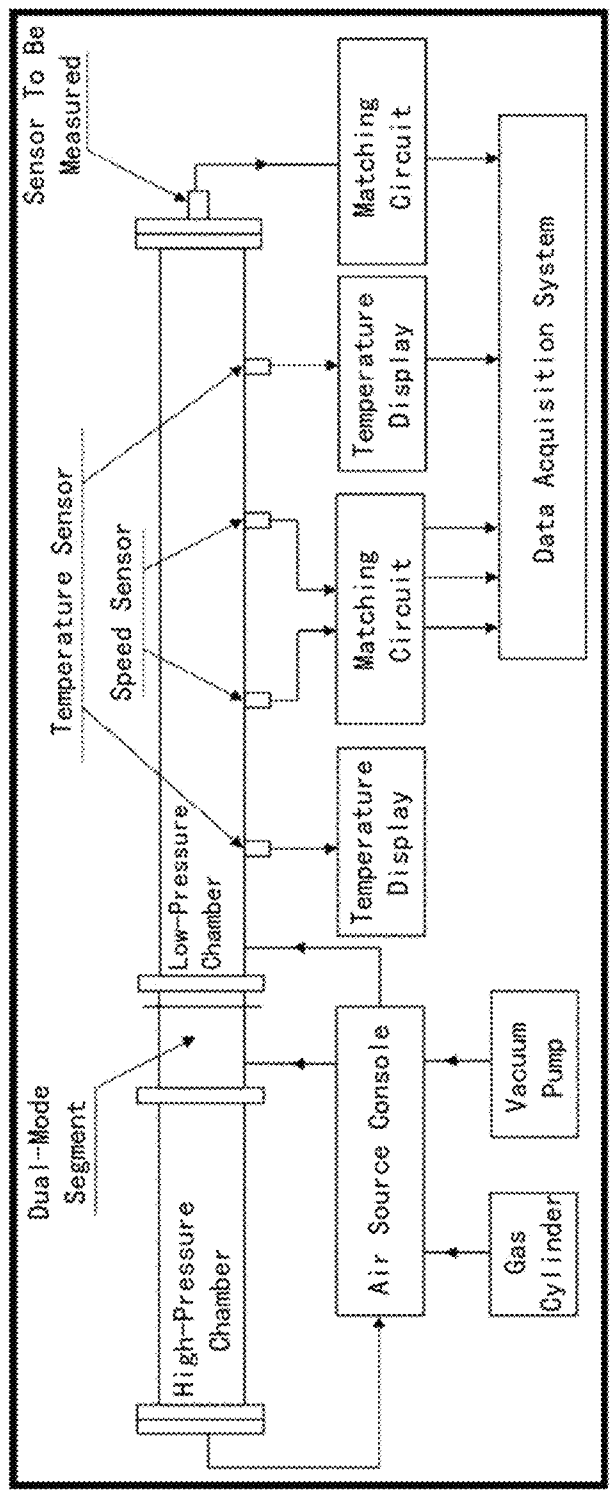
FIG. 10 is a schematic structural diagram of a shock tube dynamic calibration device according to an embodiment of the present disclosure.

FIG. 10 is a schematic structural diagram of a shock tube dynamic calibration device according to an embodiment of the present disclosure. As shown in FIG. 10, in the high frequency band dynamic calibration, a shock tube will be used as a reference step signal generator. The step signal generated by the shock tube will not only have high intensity, but also cover a wide range in the high frequency band. For the plasma pressure sensor of the present disclosure, it is intended to utilize a shock tube to generate a step pressure as a standard signal to be applied to the sensor so as to calibrate and analyze actual operating performance of the sensor. As shown in FIG. 10, the entire calibration system includes a shock tube, a multi-channel acquisition card, a piezoresistive pressure sensor, a calibrated sensor, a signal conditioning and matching circuit, a diaphragm, a vacuum pump, etc. One segment of the shock tube is evacuated as a low-pressure chamber, and the other segment is used as a high pressure chamber. The two segments are separated by the diaphragm. The magnitude of the shock wave pressure is determined by a thickness of the diaphragm. During the experiment, a gas film explosion was utilized as means to generate an approximate step response signal. The calibrated pressure sensor may be provided on a side surface or on an end face where the low-pressure segment terminates. The piezoresistive dynamic sensor and the plasma pressure sensor are respectively arranged at different coaxial positions of the shock tube to measure the pressure response curve at the moment of gas film explosion, and the response curve measured by the piezoresistive dynamic sensor may be used for a reference pressure signal. The rise time of a shock wave is usually 0.1 microseconds or less. Therefore, it can calibrate a sensor with a resonance frequency of less than 1 MHz, and accurately measure the resonance frequency, rise time, and dynamic sensitivity of the sensor.

The high frequency response pressure sensor based on direct current glow discharge plasma principle according to the present disclosure has the following advantages:

(1) The high frequency response pressure sensor based on direct current glow discharge plasma principle according to the present disclosure utilizes a direct current power supply to drive glow discharge, avoiding frequency interference otherwise caused by modulation and demodulation of AC carrier frequency, direct current driving has advantages including easy control, easy generation of stable glow discharge and the like.

(2) With the high frequency response pressure sensor based on direct current glow discharge plasma principle according to the present disclosure, the problem in decoupling airflow speed and pressure is avoided by improving the structure of the sensor, shielding the speed of the airflow, and studding the steady-state response and dynamic response characteristics of the DC-driven glow discharge plasma to a gas pressure.

(3) With the high frequency response pressure sensor based on direct current glow discharge plasma principle according to the present disclosure, by arranging the sensor on the top of a blade of a high-load air compressor such that it senses a pressure fluctuation on the wall surface, a high frequency dynamic pressure measurement in a tip region of the blade of the air compressor can be realized, thereby capturing stall precursors and pre-stall precursors.

(4) With the high frequency response pressure sensor based on direct current glow discharge plasma principle according to the present disclosure, a pressure fluctuation intensity at the blade tip and a steady mapping of the static pressure flow field at the blade tip of the rotor blade can be measured and obtained by arranging the sensor array at different axial positions on the wall surface at the blade tip of the compressor, measuring the pressure on the wall surface and finally employing a phase-locked averaging data processing method.

The proposal of the present disclosure not only meets the increasingly sophisticated development requirements of measurement and design of the turbomachinery and provides more abundant experimental data for checking the correctness of the advanced CFD calculation results, but also enriches and develops the gas discharge theory, having important scientific significance and industrial application value.

The specific embodiments described above further describe the objectives, technical solutions, and beneficial effects of the present disclosure. It should be understood that the above are only specific embodiments of the present disclosure and are not intended to limit the present disclosure. Any modification, equivalent replacement, or improvement made within the spirit and principle of the present disclosure should be included in the protection scope of the present disclosure.

What is claimed is:

1. A high frequency response pressure sensor based on a direct current glow discharge plasma principle, comprising:
- discharge electrodes comprising a cathode electrode and an anode electrode and configured for generating plasma between the cathode electrode and the anode electrode under an action of a high voltage direct current power supply;
- a support structure for supporting and fixing the discharge electrodes to ensure a stable gap between the cathode electrode and the anode electrode;
- a shielding casing for shielding the plasma from an external gas, such that the plasma is not affected by a flow speed of the external gas and senses only a change of pressure of the external gas; and
- an external circuit for supplying a direct current voltage to the discharge electrodes and measuring and limiting a current in the external circuit to which the discharge electrodes are connected, the external circuit comprising:
  - a current sampling resistor in series connected to the discharge electrodes and configured for measuring the current in the external circuit to which the discharge electrodes are connected;
  - a current limiting resistor in series connected to the discharge electrodes and configured for limiting a value of a current in the external circuit to which the discharge electrodes are connected; and
  - the high voltage direct current power supply for supplying a voltage to the discharge electrodes, the current sampling resistor, and the current limiting resistor.

2. The high frequency response pressure sensor according to claim 1, further comprising an acquisition system for measuring and processing current and voltage data from the external circuit and a voltage sensor, the acquisition system comprising:
- a high voltage probe for measuring a voltage across the discharge electrodes and a voltage across two ends of the current sampling resistor;
- an oscilloscope for receiving and processing voltage and current data measured by the high voltage probe; and/or
- a PXI acquisition system for receiving and processing voltage data attenuated by 1000 times by the high voltage probe.

3. The high frequency response pressure sensor according to claim 1,
- wherein a highest voltage amplitude of the direct current power supply is 10 kV;
- wherein when the pressure sensor is in operation, a voltage across the discharge electrodes is maintained in a range from 300 to 450 V;
- wherein the current in the external circuit ranges from 1 mA to 10 mA; and
- wherein the pressure sensor has a power range of from 0.3 W to 4.5 W.

4. The high frequency response pressure sensor according to claim 1,
- wherein the shielding casing is disposed on the support structure, such that a bottom of the shielding casing is in contact with the support structure, and the discharge electrodes are shielded inside the shielding casing; and
- wherein a hole is provided in the top of the shielding casing such that the plasma senses the change of pressure of the external gas.

5. The high frequency response pressure sensor according to claim 1, wherein the support structure comprises:
- an electrode support column comprising an anode support post and a cathode support post respectively connected to the cathode electrode and the anode electrode to support and fix the anode electrode and the cathode electrode; and
- a non-metallic support base arranged below the electrode support column to fix the electrode support column so as to ensure the stable gap between the anode electrode and the cathode electrode.

6. The high frequency response pressure sensor according to claim 5,
- wherein the non-metallic support base and the shielding casing are made of a non-metallic material;
- wherein the shielding casing is disposed on the non-metallic support base, and the bottom of the shielding casing is in contact with the non-metallic support base, such that the discharge electrodes and the electrode support column are shielded inside the shielding casing; and
- wherein the shielding casing and the non-metallic support base are assembled together after being separately processed, or are formed integrally.

7. The high frequency response pressure sensor according to claim 1,
- wherein the gap between the cathode electrode and the anode electrode is determined by a pressure range to be measured;
- wherein when the pressure range to be measured falls in a low pressure range, a large gap range is selected, the low pressure range means that an absolute pressure is in a range of 0.03 MPa to 0.1 MPa, and the large gap range is 200 μm to 300 μm; and
- wherein when the pressure range to be measured falls in a high pressure range, a small gap range is selected, the high pressure range means that an absolute pressure is in a range of 0.1 MPa to 0.5 MPa, and the small gap range is 10 μm to 100 μm.

8. The high frequency response pressure sensor according to claim 1,
- wherein a material of the discharge electrodes is an alloy metal resistant to corrosion and high temperature or a rare metal; and/or
- wherein the discharge electrodes each have a cylindrical, semi-circular, square, flat, symmetric or asymmetric structure; and
- wherein diameters of the discharge electrodes are selectable at a level of millimeters to centimeters.

9. The high frequency response pressure sensor according to claim 1,
- wherein a calibration for a voltage-gas pressure correlation of the high frequency response pressure sensor, which comprises a static calibration and a shock tube dynamic calibration, is performed before the high frequency response pressure sensor is applied to an air compressor to measure the pressure.

10. The high frequency response pressure sensor according to claim 5, further comprising an acquisition system for measuring and processing current and voltage data from the external circuit and a voltage sensor, the acquisition system comprising:

a high voltage probe for measuring a voltage across the discharge electrodes and a voltage across two ends of the current sampling resistor;

an oscilloscope for receiving and processing voltage and current data measured by the high voltage probe; and/or a PXI acquisition system for receiving and processing voltage data attenuated by 1000 times by the high voltage probe.

11. The high frequency response pressure sensor according to claim 5, wherein a highest voltage amplitude of the direct current power supply is 10 kV;

wherein when the pressure sensor is in operation, a voltage across the discharge electrodes is maintained in a range from 300 to 450 V;

wherein the current in the external circuit ranges from 1 mA to 10 mA; and wherein the pressure sensor has a power range of from 0.3 W to 4.5 W.

12. The high frequency response pressure sensor according to claim 5, wherein the shielding casing is disposed on the support structure, such that a bottom of the shielding casing is in contact with the support structure, and the discharge electrodes are shielded inside the shielding casing; and wherein a hole is provided in the top of the shielding casing such that the plasma senses the change in pressure of the external gas.

13. The high frequency response pressure sensor according to claim 6, further comprising an acquisition system for measuring and processing current and voltage data from the external circuit and a voltage sensor, the acquisition system comprising:

a high voltage probe for measuring a voltage across the discharge electrodes and a voltage across two ends of the current sampling resistor;

an oscilloscope for receiving and processing voltage and current data measured by the high voltage probe; and/or a PXI acquisition system for receiving and processing voltage data attenuated by 1000 times by the high voltage probe.

14. The high frequency response pressure sensor according to claim 6, wherein a highest voltage amplitude of the direct current power supply is 10 kV;

wherein when the pressure sensor is in operation, a voltage across the discharge electrodes is maintained in a range from 300 to 450 V;

wherein the current in the external circuit ranges from 1 mA to 10 mA; and wherein the pressure sensor has a power range of from 0.3 W to 4.5 W.

15. The high frequency response pressure sensor according to claim 6, wherein the shielding casing is disposed on the support structure, such that a bottom of the shielding casing is in contact with the support structure, and the discharge electrodes are shielded inside the shielding casing; and wherein a hole is provided in the top of the shielding casing such that the plasma senses the change in pressure of the external gas.

16. The high frequency response pressure sensor according to claim 7, further comprising an acquisition system for measuring and processing current and voltage data from the external circuit and a voltage sensor, the acquisition system comprising:

a high voltage probe for measuring a voltage across the discharge electrodes and a voltage across two ends of the current sampling resistor;

an oscilloscope for receiving and processing voltage and current data measured by the high voltage probe; and/or a PXI acquisition system for receiving and processing voltage data attenuated by 1000 times by the high voltage probe.

* * * * *

UNITED STATES PATENT AND TRADEMARK OFFICE

CERTIFICATE OF CORRECTION

PATENT NO. : 11,268,870 B2
APPLICATION NO. : 16/629840
DATED : March 8, 2022
INVENTOR(S) : Fan Li et al.

It is certified that error appears in the above-identified patent and that said Letters Patent is hereby corrected as shown below:

On the Title Page

In item (73), Assignee: "INSTITUTE OF ENGINEERING THERMOPHYSIC, CHINESE ACADEMY OF SCIENCES" should read -- INSTITUTE OF ENGINEERING THERMOPHYSICS, CHINESE ACADEMY OF SCIENCES --.

Signed and Sealed this
Fifteenth Day of November, 2022

Katherine Kelly Vidal

Katherine Kelly Vidal
*Director of the United States Patent and Trademark Office*